(12) United States Patent
Junkawitsch et al.

(10) Patent No.: US 7,392,188 B2
(45) Date of Patent: Jun. 24, 2008

(54) SYSTEM AND METHOD ENABLING ACOUSTIC BARGE-IN

(75) Inventors: Jochen Junkawitsch, Eschenbach (DE); Raymond Bruckner, Blaustein (DE); Klaus Reinhard, Arnstadt (DE); Stefan Dobler, Neunkirchen am Brand (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 789 days.

(21) Appl. No.: 10/631,985

(22) Filed: Jul. 31, 2003

(65) Prior Publication Data

US 2005/0027527 A1 Feb. 3, 2005

(51) Int. Cl.
*G10L 15/06* (2006.01)
(52) U.S. Cl. ...................................... 704/251
(58) Field of Classification Search ................. 704/251
See application file for complete search history.

(56) References Cited

U.S. PATENT DOCUMENTS

| | | | | |
|---|---|---|---|---|
| 5,978,763 | A * | 11/1999 | Bridges | 704/233 |
| 6,107,935 | A * | 8/2000 | Comerford et al. | 340/5.52 |
| 6,574,595 | B1 * | 6/2003 | Mitchell et al. | 704/242 |
| 6,603,836 | B1 * | 8/2003 | Johnston | 379/88.16 |
| 6,606,595 | B1 * | 8/2003 | Chengalvarayan et al. | 704/256.5 |
| 6,801,893 | B1 * | 10/2004 | Backfried et al. | 704/257 |
| 2004/0093206 | A1 * | 5/2004 | Hardwick | 704/221 |
| 2004/0226459 | A1 * | 11/2004 | Hill et al. | 100/116 |
| 2005/0038659 | A1 * | 2/2005 | Helbing | 704/271 |
| 2007/0198267 | A1 * | 8/2007 | Jones et al. | 704/257 |

OTHER PUBLICATIONS

Chengalvarayan, Thompson, Setlur and Ketchum, "HMM-Based Echo Model for Noise Cancellation Avoiding the Problem of False Triggers" IEEE Int'l Symposium on Intelligent Signal, Nov. 5-8, 2000 Honolulu, Hawaii, USA.

Chengalvarayan and Thomson, "Discriminatively Derived HMM-Based Announcement Modeling Approach for Noise Control Avoiding the Problem Of False Alarms"—6th International Conference on Spoken Language Processing (ICSLP 2000) Beijing, China—Oct. 16-20, 2000; XP-002299523.

Villarrubia and Acero, "Rejection Techniques for Digit Recognition in Telecommunication Applications" Madrid, Spain; Publication Date: Apr. 27, 1993; XP000427824.

* cited by examiner

*Primary Examiner*—Susan McFadden

(57) ABSTRACT

A system and method enabling acoustic barge-in during a voice prompt in a communication system. An acoustic prompt model is trained to represent the system prompt using the specific speech signal of the prompt. The acoustic prompt model is utilized in a speech recognizer in parallel with the recognizer's active vocabulary words to suppress the echo of the prompt within the recognizer. The speech recognizer may also use a silence model and traditional garbage models such as noise models and out-of-vocabulary word models to reduce the likelihood that noises and out-of-vocabulary words in the user utterance will be mapped erroneously onto active vocabulary words.

22 Claims, 7 Drawing Sheets

SYSTEM AND METHOD ENABLING ACOUSTIC BARGE-IN

TECHNICAL FIELD

The present invention relates to communication systems. More particularly, and not by way of limitation, the present invention is directed to a system and method that enables the user of a communication device to interrupt, or barge-in, during a system voice announcement, or prompt, to initiate a desired function prior to the conclusion of the prompt.

BACKGROUND ART

In communication networks, system operators often find it convenient to implement automated system voice announcements, or "prompts", to inform subscribers, for example, of certain available features or certain actions that the subscriber must take to activate particular features. For many subscribers, this information is useful the first few times they hear it, but after hearing it several times, subscribers may wish to interrupt, or "barge-in", during the system voice prompt because they already know what the prompt says and what actions they need to take. In existing communication networks, a barge-in capability is normally realized by running a standard speech recognizer during the voice prompt. In order to avoid erroneous speech recognizer output due to the input of both the user's voice and the sound (echo) of the prompt originating from the device's loudspeaker, an acoustic echo cancellation technique is normally utilized to suppress feedback of the prompt echo to the recognizer.

As next generation communication devices are developed, it will be increasingly important to have user-friendly man-machine interfaces (MMIs) that enable the devices to be operated in a hands-free mode. Multi-modal MMIs and intelligent speech-driven dialog interfaces are needed that are well accepted by users and that provide flexible interaction with the system. An improved capability to barge-in will be required in order to enable a user to interrupt a system prompt by simply speaking while the prompt is being played.

There are three major shortcomings of the existing methods of providing a barge-in capability. First, conventional echo cancellation algorithms may provide a very weak attenuation of the prompt echo. For example, echo attenuation of 10 dB or less may occur. This may cause serious problems with misrecognitions by the speech recognizer because the speech recognizer is triggered by the prompt echo. Second, standard adaptive echo cancellation methods require a fixed timing correlation between the voice input channel and the voice output channel. In distributed systems, however, it is often too expensive, or not possible, to obtain this temporal correlation, especially when the recognition server and the server that plays the prompt are separated by some distance. Third, standard adaptive echo cancellation methods require a considerable amount of processing power. This is a significant challenge for embedded systems with restrictive hardware constraints or for multi-channel applications where as many channels as possible have to be processed in parallel.

Due to the above-described shortcomings of conventional echo cancellation methodologies, an alternative methodology for enabling the user of a hands-free communication device to barge-in during a system voice prompt is needed.

SUMMARY OF THE INVENTION

In one aspect, the present invention is directed to a method of suppressing speech recognition errors in a speech recognition system in which an input signal includes an echo from a system voice prompt combined with user input speech. The method includes the steps of generating an acoustic model of the system voice prompt that mathematically represents the system voice prompt; supplying the input signal to a speech recognizer having an acoustic model of a target vocabulary that mathematically represents at least one command word; and comparing the input signal to the acoustic prompt model and to the acoustic target vocabulary model. The method then determines whether the acoustic prompt model or the acoustic target vocabulary model provides a best match for the input signal during the comparing step. If the acoustic target vocabulary model provides the best match, the best match is accepted. If the acoustic prompt model provides the best match, the best match is ignored. The speech recognizer may also use a silence model and traditional garbage models such as noise models and out-of-vocabulary word models to reduce the likelihood that noises and out-of-vocabulary words in the user utterance will be mapped erroneously onto active vocabulary words.

In another aspect, the present invention is directed to a method of suppressing speech recognition errors and improving word accuracy in a speech recognition system that enables a user of a communication device to interrupt a system voice prompt with command words that halt the voice prompt and initiate desired actions. The method includes the steps of generating an acoustic model of the system voice prompt that mathematically represents the system voice prompt; storing the acoustic prompt model in a speech recognizer; and storing a target vocabulary model in the speech recognizer that includes models of a plurality of command words. The method also includes supplying the input signal to a comparer in the speech recognizer; comparing the input signal to the acoustic target vocabulary model and the acoustic prompt model to identify which model provides a best match for the input signal; ignoring the best match if the acoustic prompt model provides the best match; and accepting the best match if the acoustic target vocabulary model provides the best match. The method also includes supplying to an action table, any command word corresponding to the best match provided by the acoustic target vocabulary model; identifying from the action table, an action corresponding to the supplied command word; halting the system voice prompt; and initiating the identified action.

In yet another aspect, the present invention is directed to a speech recognizer for recognizing input command words while suppressing speech recognition errors, wherein a signal input to the speech recognizer includes an echo from a system voice prompt combined with user input speech. The speech recognizer includes an acoustic vocabulary model that mathematically represents at least one command word; an acoustic prompt model that mathematically represents the system voice prompt; and a comparer that receives the input signal and compares the input signal to the acoustic vocabulary model and to the acoustic prompt model to determine which model provides a best match for the input signal. The comparer accepts the best match if the acoustic target vocabulary model provides the best match, and ignores the best match if the acoustic prompt model provides the best match. The speech recognizer may also use a silence model and traditional garbage models such as noise models and out-of-vocabulary word models to reduce the likelihood that noises and out-of-vocabulary words in the user utterance will be mapped erroneously onto active vocabulary words.

In still yet another aspect, the present invention is directed to a speech recognition system for suppressing speech recognition errors and improving word accuracy. The system enables a user of a communication device to interrupt a system voice prompt with command words that halt the voice prompt and initiate desired actions. The system includes means for generating an acoustic model of the system voice prompt that mathematically represents the system voice prompt; an acoustic vocabulary model comprising mathematical models of a plurality of command words; and a comparer that receives an input signal comprising both user speech and an echo of the system voice prompt, and compares the input signal to the acoustic vocabulary model and to the acoustic prompt model to determine which model provides a best match for the input signal. The comparer accepts the best match if the acoustic target vocabulary model provides the best match, and ignores the best match if the acoustic prompt model provides the best match. The system also includes an action table that receives a command word from the comparer upon a determination by the comparer that the acoustic target vocabulary model provides the best match. The action table associates the received command word with a corresponding action, and notifies an associated network to initiate the corresponding action, and to halt the system voice prompt.

DETAILED DESCRIPTION OF EMBODIMENTS

Contrary to traditional approaches utilizing an echo cancellation algorithm, the present invention generates an acoustic prompt model and utilizes the acoustic prompt model as a "garbage" model in parallel with the active vocabulary words of the speech recognizer to compensate within the recognizer for the acoustic echo of the prompt. A specific acoustic prompt model is generated from the announcement to compensate for the false alarms of the recognizer. Since the system prompt is typically announced using a single speaker's voice, a speaker-dependent acoustic model of the system prompt is preferably generated. In this process, the acoustic prompt model is trained using the speech signal of the specific system prompt, and thus represents the system prompt, including speech and any other sounds (e.g., beeps and the like) that are present in the prompt. Alternatively, a speaker-independent acoustic model of the system prompt may be generated. In this process, the orthographic text of the prompt is utilized to build the prompt model by concatenating the appropriate phonetic units.

The prompt model may be created through offline training in advance, or by online generation. In the first alternative, the various system prompts are known, and the acoustic prompt models are trained in advance. This method is suitable for both speaker-independent phonetic training and speaker-dependent training using the speech signal of the prompt. The prompt server is provided with a list of system prompts, and the speech recognizer is provided with a corresponding list of acoustic prompt models. When a prompt is to be played, a system controller instructs the prompt server to play, for example prompt "n", and instructs the speech recognizer to use the corresponding acoustic prompt model "n". When utilizing speaker-independent phonetic training, phonetic units are determined from the various system prompts, and may be stored in a database accessible by the recognizer. When the controller informs the recognizer of the prompt model to be utilized, the controller sends the orthographic text of the prompt to the recognizer. The recognizer then builds the prompt model by concatenating the appropriate phonetic units, which are selected utilizing the orthographic text of the prompt. When using online generation, the acoustic prompt model is generated immediately before the speech recognizer is started. The system controller sends the speech signal of the prompt to the recognizer, and the recognizer builds up the prompt model from the speech signal and starts recognition.

During recognition, the Viterbi path is allowed to leave the acoustic prompt model in each state to enable the beginning of a user input. Thus, as soon as the user utters a valid command word, the Viterbi path leaves the acoustic prompt model and enters an active vocabulary word model. Thus, the prompt model needs only to be partially recognized until the user interrupts the system by his user input.

Figure 1:
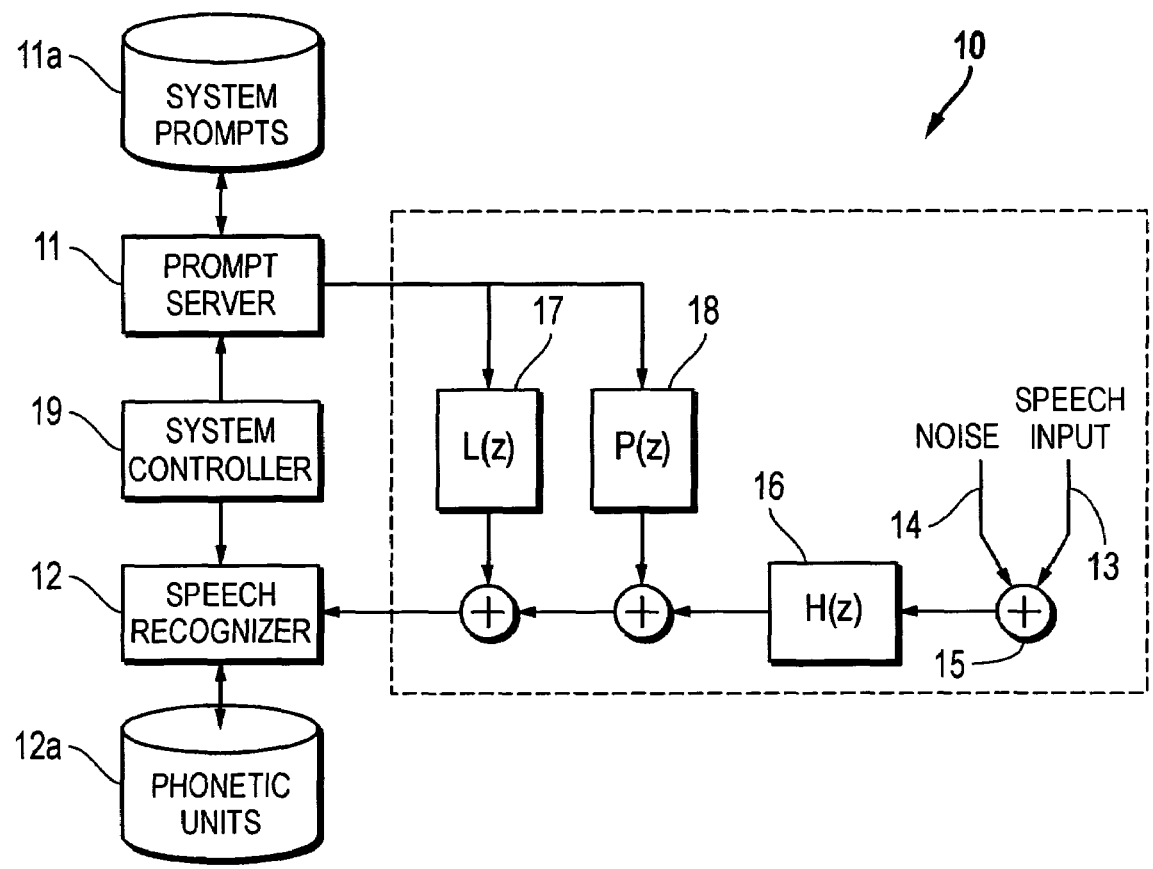
FIG. 1 is a simplified block diagram of an Automated Speech Recognition (ASR) system suitable for use with the present invention.

FIG. 1 is a simplified block diagram of an Automated Speech Recognition (ASR) system 10 suitable for use with the present invention. A prompt server 11 plays a system voice prompt. At the same time, a speech recognizer 12 analyzes speech input from the user. The user's speech input 13 and background noise 14 are input through a microphone 15. Function H(z) 16 represents the microphone and voice input channel characteristics. In the experimental verification of the present invention, no special microphone or voice input channel characteristics, H(z), were considered because the user's speech input was considered to implicitly contain the microphone and channel characteristics.

In addition to the noisy user input, two types of echos also arrive at the speech recognizer 12. Function L(z) 17 models the path of the line echo, which is caused by electrical feedback in the telephone device and telephone network. In the development of the present invention, the line echo, L(z), was assumed to be negligible with respect to the acoustic echo, especially in hands-free environments. Function P(z) 18 represents an echo transfer function for the acoustic echo of the prompt. The acoustic transfer function is a mathematical description of how the sound waves of the prompt are modified when they travel from the loudspeaker to the microphone on the user's device. It is particularly important to consider this type of echo, and the echo transfer function, when operating in a hands-free environment where the user's loudspeaker is set at a high volume. Of course, the characteristics of the echo transfer function depend on the actual physical environment of the user.

As noted above, a system controller 19 instructs the prompt server 11 to play a selected system voice prompt, and instructs the speech recognizer 12 to use an acoustic prompt model corresponding to the selected voice prompt. Thus, a system prompt database 11a may be associated with the prompt server, and may be accessed by the prompt server when directed by the system controller. The system prompt database may be internal or external to the prompt server. Likewise, a phonetic units database 12a may be associated with the speech recognizer. The phonetic units database may be internal or external to the speech recognizer. When utilizing offline, speaker-independent phonetic training of the acoustic prompt model, the system controller 19 provides the speech recognizer with the orthographic text of the selected prompt. The speech recognizer 12 then retrieves the appropriate phonetic units from the phonetic units database 12a and concatenates them to build the acoustic prompt model corresponding to the selected system voice prompt.

For the experiments discussed below, sound measurements were taken under three different sets of real-world conditions, and three different echo transfer functions were defined and utilized. The three conditions were a cafeteria, a conference room, and a car. Additionally, two types of noise (babble noise and car noise) were added to the input signal. The noise inputs were added to the system with varying attenuation of the noise signal so that experiments could be carried out at varying signal-to-noise ratios (SNRs).

Figure 2:
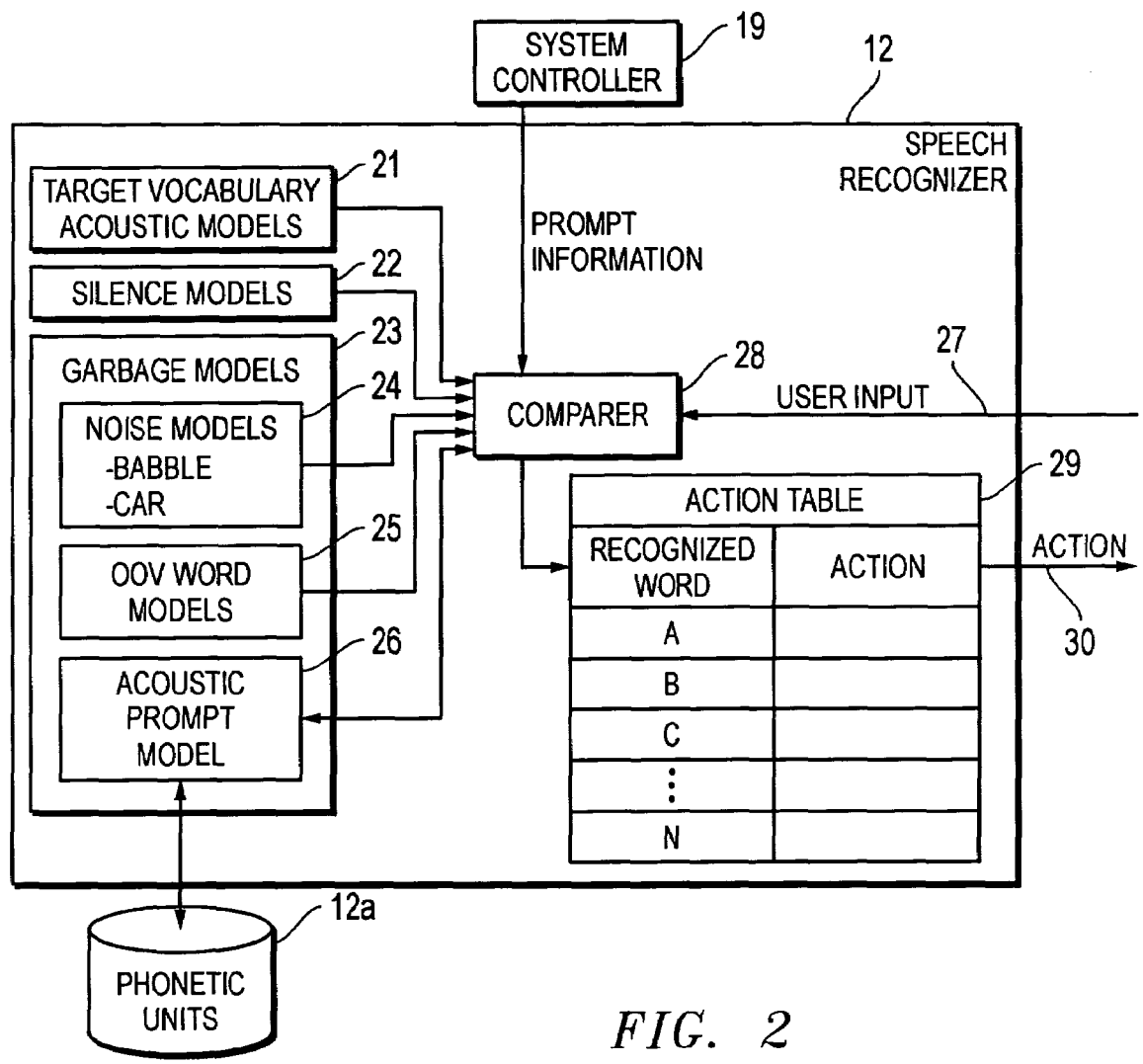
FIG. 2 is a simplified block diagram of a speech recognizer in a preferred embodiment of the present invention.

FIG. 2 is a simplified block diagram of the speech recognizer 12 in a preferred embodiment of the present invention. The speech recognizer works by matching a set of acoustic models 21-26 against an input user utterance 27. A comparer 28 receives the input user utterance and compares the input to the various models. The comparer may include a simple connected word recognition grammar, an arbitrary grammar, or a so-called "language model" to make the comparison. Target vocabulary acoustic models 21 represent the words that the speech recognizer should be able to recognize. These models form the active vocabulary (command words) of the speech recognizer. In addition to these target vocabulary acoustic models, other acoustic models are used within the recognizer to represent the rest of the speech signal. First, there is a "silence" model 22 that is an acoustic representation of silence (i.e., no user input and no noise). Additionally, there are "garbage" models 23 that include models of common noises 24 such as babble or car noise, and/or models of Out-Of-Vocabulary (OOV) words 25 that are not among the active vocabulary. The use of these garbage models reduces the likelihood that noises and OOV words in the user utterance will be mapped erroneously onto vocabulary words. The present invention adds an acoustic prompt model 26 to the speech recognizer as an additional garbage model. This model reduces the likelihood that words in a system prompt echo contained in the user utterance will be mapped erroneously onto vocabulary words. If any of the garbage models gives the best match during the recognition process, the matching noises, OOV words, and system prompt words are ignored, and no recognition errors occur.

When the best match during the recognition process is an active vocabulary command word, the recognizer enters an action table 29 where the recognized word is associated with a corresponding action 30. The speech recognizer 12 may then send the corresponding action to the network to be executed. In a barge-in situation, then network then sends a command to the prompt server 11 to halt the system voice prompt.

Figure 3:
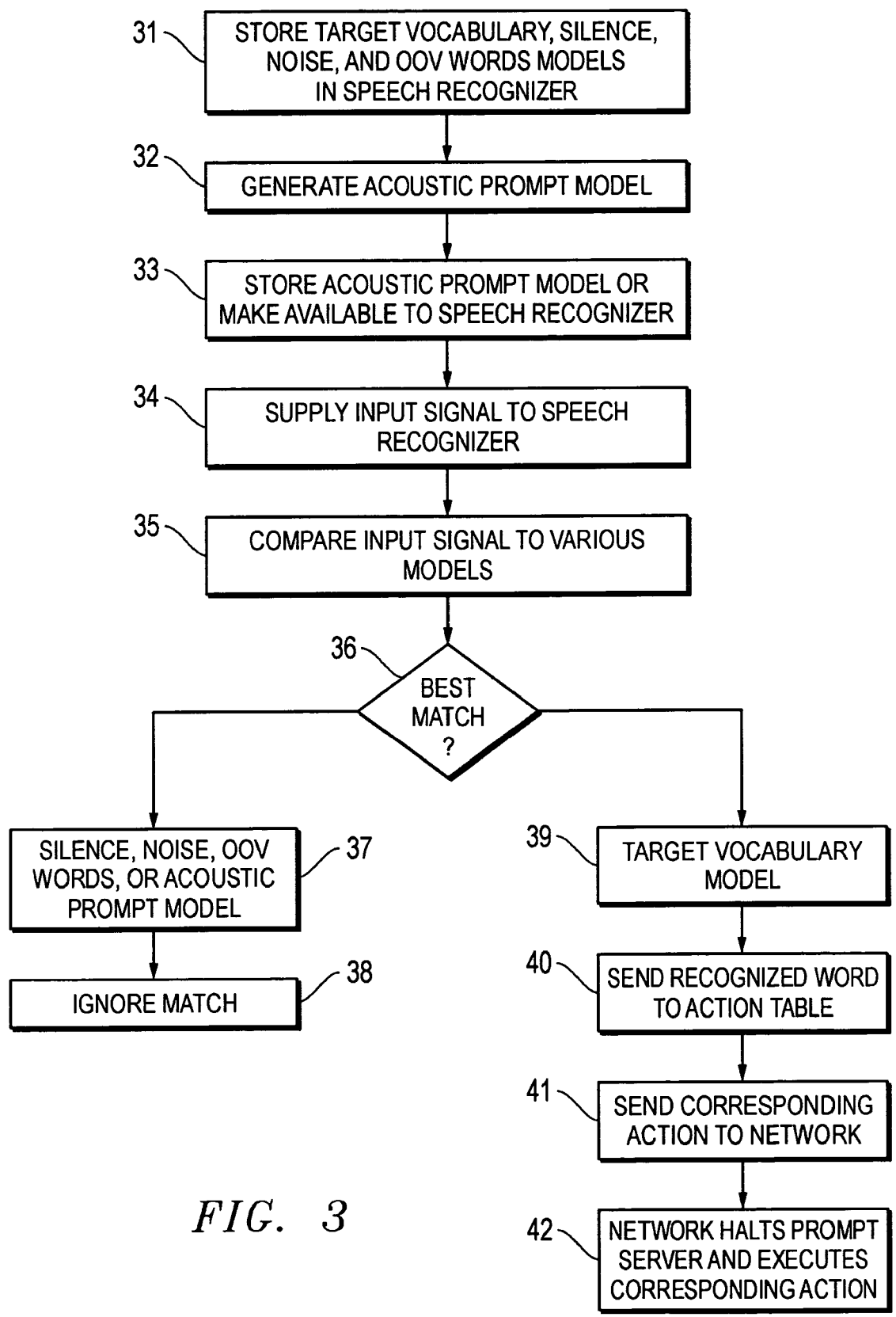
FIG. 3 is a flow chart illustrating the steps of the preferred embodiment of the method of the present invention.

FIG. 3 is a flow chart illustrating the steps of the preferred embodiment of the method of the present invention. At step 31, the speech recognizer 12 is prepared for the recognition task by storing in it, the target vocabulary acoustic models 21, the silence model 22, the noise models 24, and the OOV words models 25. At step 32, the acoustic prompt model 26 is generated or "trained". As noted above, the prompt model may be created through offline training in advance, or by online generation. At step 33, the acoustic prompt model 26 is stored in, or otherwise made available to, the speech recognizer 12 as an additional garbage model 23. At step 34, a user input signal is supplied to the speech recognizer. The input signal includes the user's speech input along with background noise, and microphone and voice input channel characteristics. In a barge-in situation in which a system voice prompt is playing, the input signal also includes line echo caused by electrical feedback in the telephone device and telephone network, and the system voice prompt echo.

At step 35, the speech recognizer compares the input signal against the various acoustic models to determine a best match. At step 36, it is determined which model gives the best match during the recognition process. If the silence, noise, OOV words, or acoustic prompt model gives the best match, the method moves to step 37, and then ignores the match at step 38, and no recognition errors occur. However, if the target vocabulary acoustic model gives the best match, the method moves to step 39 and then at step 40, sends the recognized word to the action table 29. At step 41, the action table associates the recognized word with a corresponding action and sends the corresponding action to the network for execution. At step 42, the method concludes by sending a halt command from the network to the prompt server 11, and executing the corresponding action within the network.

Experimental Results

A large number of experiments, with a wide range of conditions (i.e., type of noise, type of echo, SNR) were performed. For each scenario, a baseline experiment without acoustic prompt models was compared to an experiment with acoustic prompt models. Several different recordings of 32 male and 32 female users were utilized as user input for the tests.

The recognition task analyzed in the experiments was typical for voice-controlled telephone applications. The active vocabulary consisted of five command words. In addition, a set of garbage models was used to cope with unexpected user input, background noise (i.e., babble noise and car noise), and the echo of the announcement. In the experiments, all command words, garbage models, and the prompt model (when applicable) were inserted in parallel into a simple connected word recognition grammar.

The prompts for the experiments were generated using a state-of-the-art text-to-speech system producing naturally sounding voice announcements. For this purpose, fourteen different prompts with durations between one and seven seconds were chosen and synthesized by one male and one female speaker. As is typical for telephone applications, the prompts themselves contained vocabulary command words that the recognizer is trying to hear from the user's speech input. For example, "help" is a vocabulary command word, and "say help for help" is one of the prompts. Thus, a goal of the invention is to enable the recognizer to reject the word "help" when it is contained in a prompt, but to accept the word "help" as a command word when it is spoken by the user.

Basically, two types of experiments were conducted. First, only the prompt echo, with no user input, was supplied to the speech recognizer. This type of experiment measures the ability of the recognizer to ignore the prompt echo to avoid false acceptances. Second, both the prompt echo and the user input were supplied to the speech recognizer. The user input was randomly varied to start at different times within the boundaries of the prompt, to realistically represent a barge-in case. This type of experiment measures the ability of the recognizer to reliably accept a user-input command word while minimizing false acceptances generated by command words within the prompt echo.

The prompt echo supplied to the speech recognizer is generally attenuated, and is convolved with a specific room impulse response. Therefore, the invention utilizes an attenuated version of the original prompt signal to train a speaker-dependent prompt model. This procedure helps reduce the mismatch between training and test for prompt models, and therefore improves recognition performance.

Figure 4:
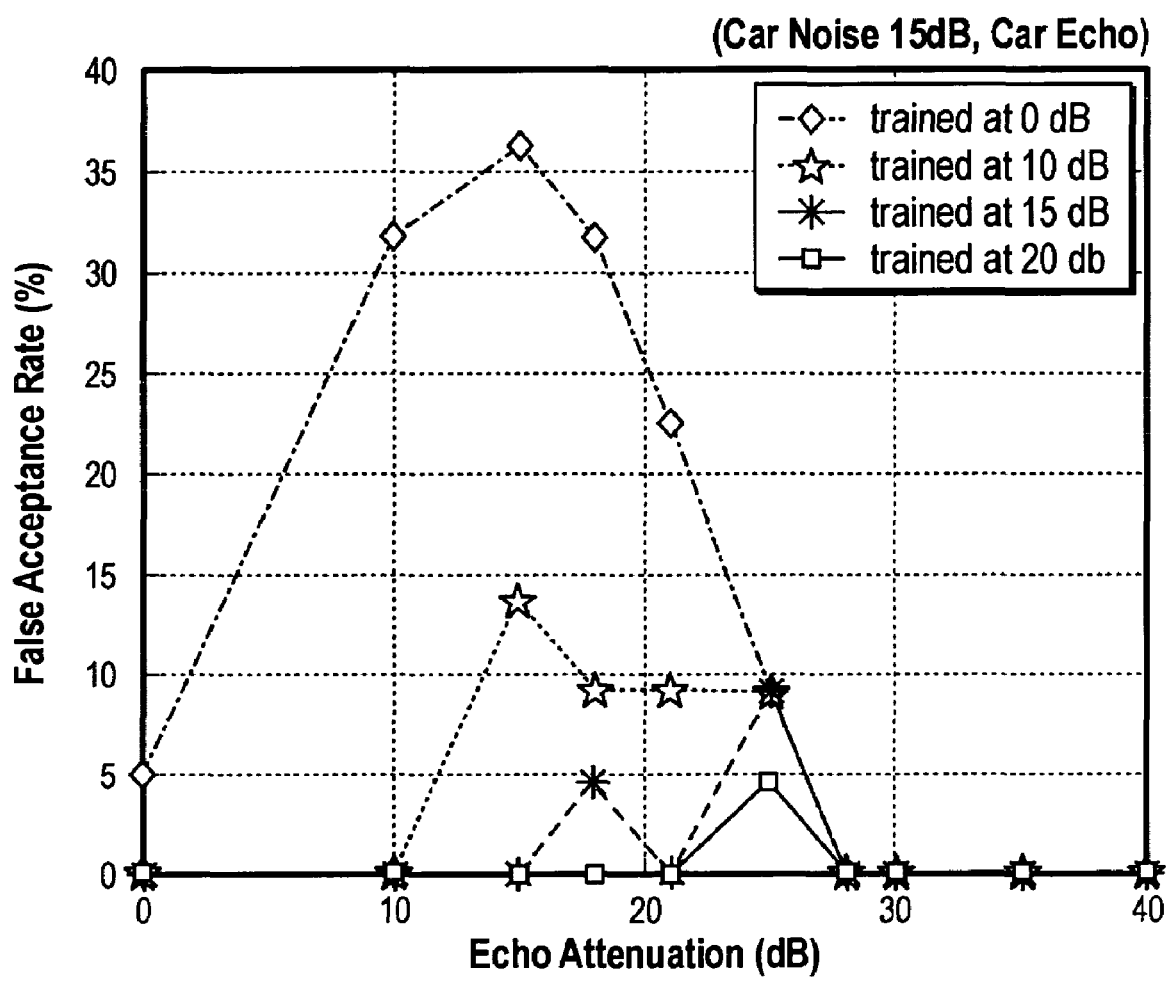
FIG. 4 is a graph of false acceptance rate of the speech recognizer as a function of the level of attenuation of an acoustic car echo, illustrating the effect of attenuating the prompt for prompt model training, for an exemplary scenario utilizing a car echo transfer function and car noise at 15 dB.

The graph in FIG. 4 illustrates the effect of attenuating the prompt for prompt model training for an exemplary scenario utilizing the car echo transfer function and car noise at 15 dB. The graph shows the false acceptance rate of the speech recognizer as a function of the level of echo attenuation when only the prompt is present (i.e., there is no user input). Each of the curves represents the false acceptance rate of the speech recognizer for prompt model training at different attenuation levels of the original signal. The graph illustrates that the best results were obtained when the prompt model was trained at a 20 dB attenuation level. Other experiments, utilizing the cafeteria and the conference room echo transfer functions, also showed that, on average, training at the 20 dB attenuation level yielded the best results for the complete range of echo attenuation. Thus, this procedure should be applied in all cases in which the actual attenuation is unknown. Training of the prompt model at 20 dB attenuation was also used for all of the following experiments.

Figure 5:
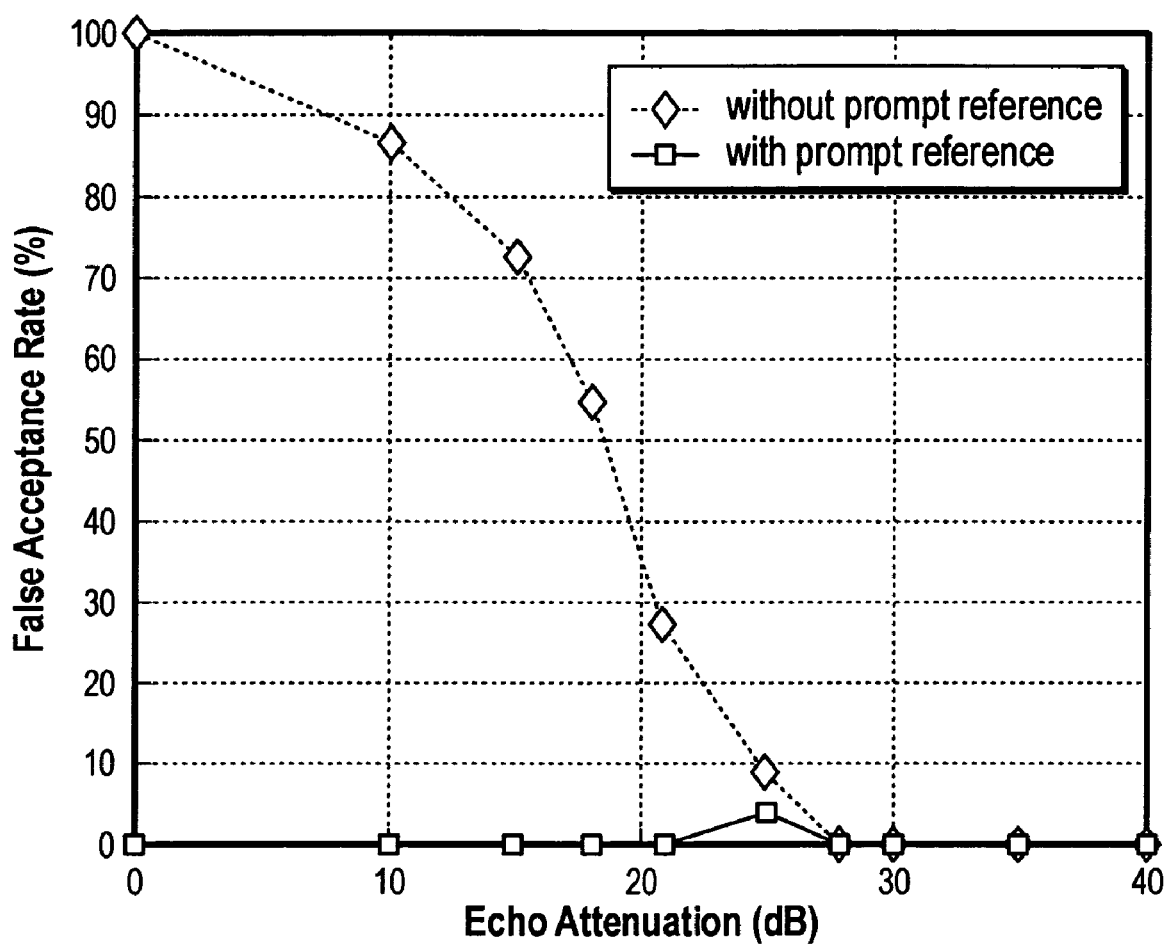
FIG. 5 is a graph of false acceptance rate of the speech recognizer as a function of the level of attenuation of an acoustic car echo, comparing the false acceptance rates with and without the use of a prompt model, when only the acoustic prompt echo is present, for an exemplary scenario utilizing a car echo transfer function and car noise at 15 dB.

The graph in FIG. 5 illustrates the results of an exemplary experiment comparing the false acceptance rates without the use of a prompt model and with the use of a prompt model, when only the acoustic prompt echo was present (i.e., there was no user input). The experiment utilized the car echo transfer function and car noise at 15 dB. Each of the curves represents the false acceptance rate of the speech recognizer as a function of the level of attenuation of the acoustic car echo. It can be seen that the use of a prompt model drastically improved the false acceptance rate, virtually eliminating false acceptances at all levels of attenuation.

Figure 6:
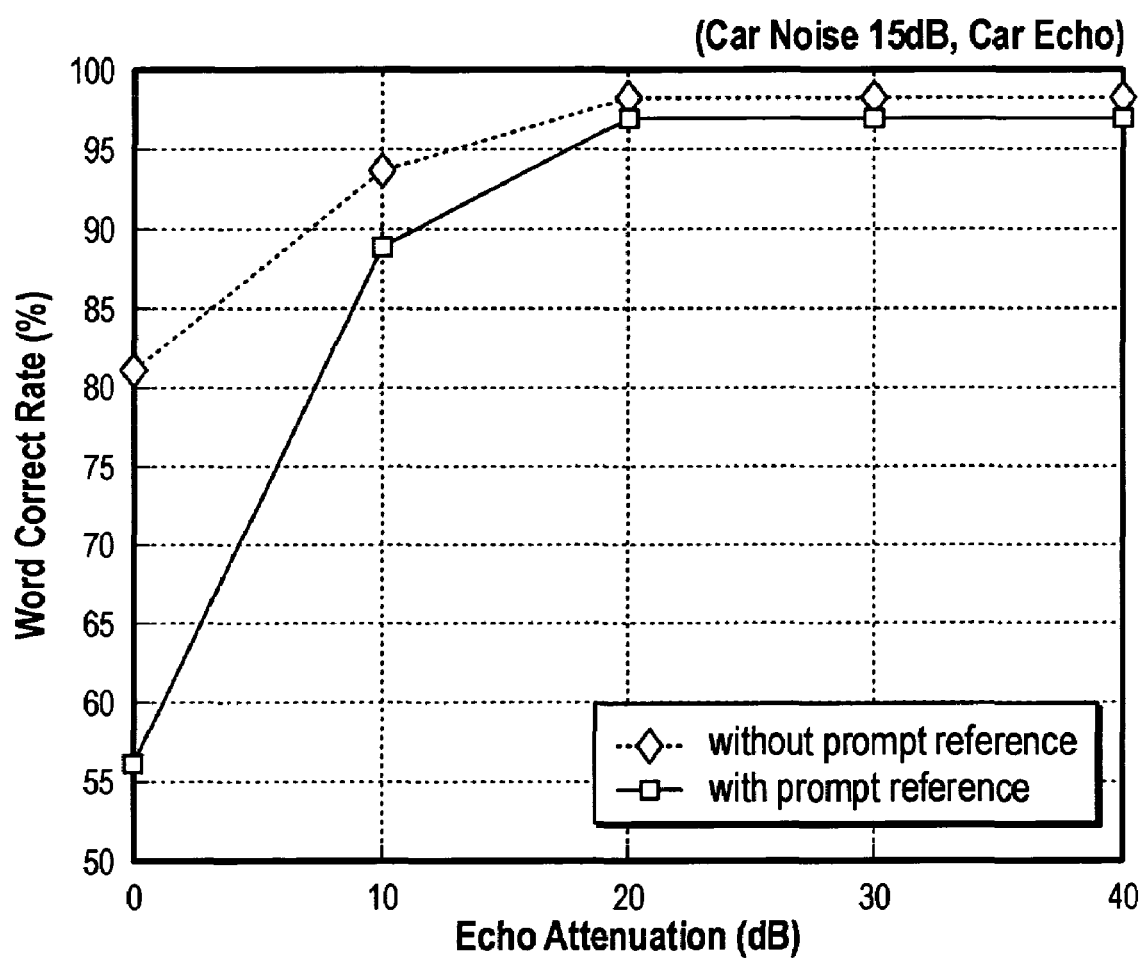
FIG. 6 is a graph of word correct rate of the speech recognizer as a function of the level of attenuation of an acoustic car echo, comparing word correct rates with and without the use of a prompt model, when user input is present in addition to the acoustic prompt echo.

The graph in FIG. 6 illustrates the results of an exemplary experiment comparing the word correct rates without the use of a prompt model and with the use of a prompt model, when user input is present in addition to the acoustic prompt echo. Only substitutions and deletions were considered as errors. FIG. 6 again illustrates a scenario utilizing the car echo transfer function and car noise at 15 dB. Each of the curves represents the word correct rate of the speech recognizer as a function of the level of attenuation of the acoustic car echo. It is to be expected that as a tradeoff for eliminating false acceptances, the word correct rate would be degraded. The experiment showed that for a low level of echo attenuation of 10 dB, the word correct rate decreased from 93.5% to 88.9% when using the prompt model. However, for higher levels of attenuation (for example, 20 dB and above), use of the prompt model had a negligible effect on the word correct rate.

Figure 7:
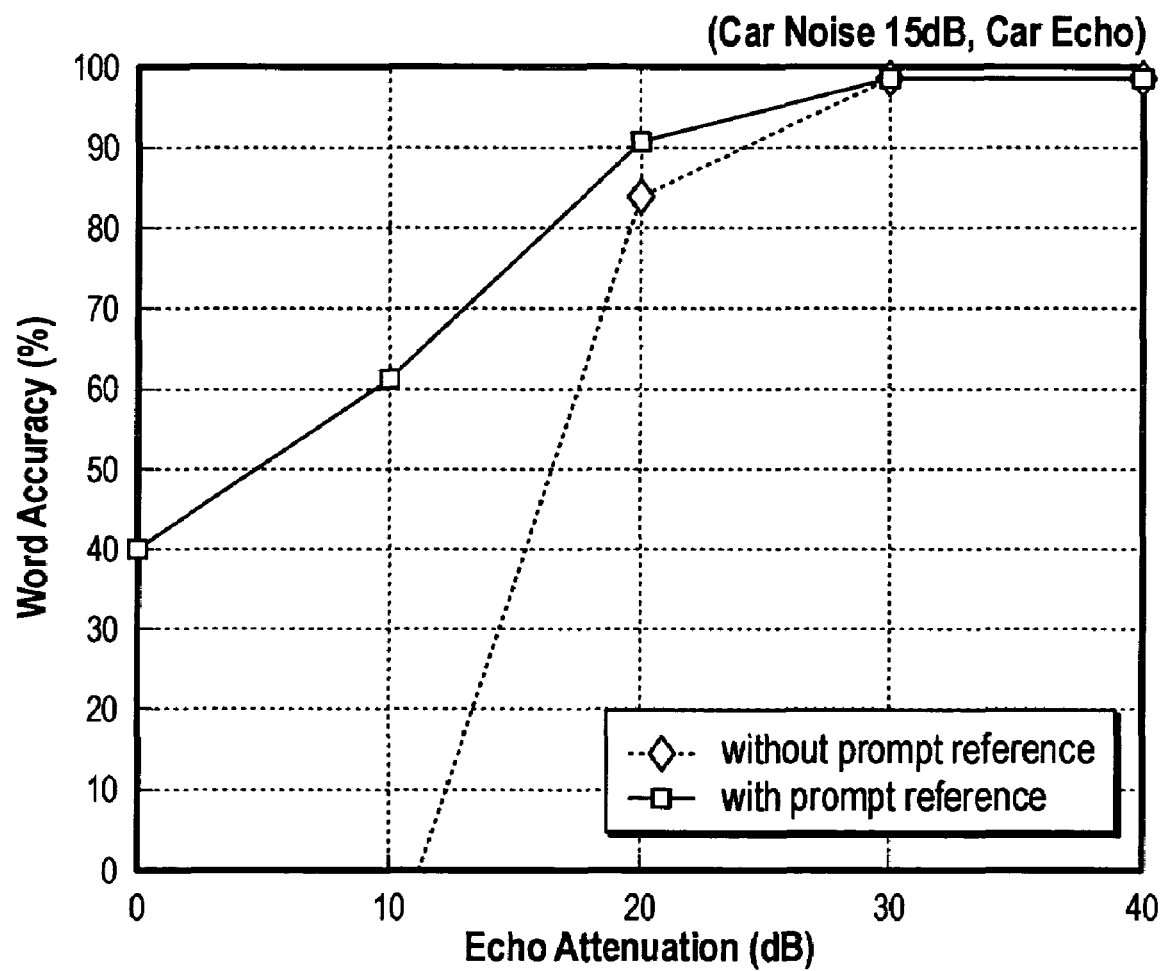
FIG. 7 is a graph of word accuracy rate of the speech recognizer as a function of the level of attenuation of an acoustic car echo, comparing word accuracy rates with and without the use of a prompt model, when user input is present in addition to the acoustic prompt echo.

The graph in FIG. 7 illustrates the results of an exemplary experiment comparing word accuracy rates without the use of a prompt model and with the use of a prompt model, when user input is present in addition to the acoustic prompt echo. Substitutions, deletions, and insertions were considered as errors. FIG. 7 again illustrates a scenario utilizing the car echo transfer function and car noise at 15 dB. Each of the curves represents the word accuracy rate of the speech recognizer as a function of the level of attenuation of the acoustic car echo. When analyzing the effect of the prompt model on word accuracy, the benefits of the present invention become even more apparent. The small negative effect of the prompt model on the word correct rate (see FIG. 6) is more than overcome by the enormous reduction of false acceptances (i.e., a reduction of insertions) (see FIG. 5). The overall result is a very significant improvement of recognition accuracy when the prompt model is utilized. For example, the recognition accuracy rises from 83.1% to 90.6% when the echo attenuation is 20 dB. For lower levels of attenuation, the improvement is even greater.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of suppressing speech recognition errors in a speech recognition system, said method comprising the steps of:
   receiving an input signal that comprises at least one user-generated command word and an echo from an outgoing system voice prompt, wherein at least one word of the outgoing system voice prompt is included in the echo received in the input signal;
   generating an acoustic model of the outgoing system voice prompt, said acoustic prompt model mathematically representing the words of the outgoing system voice prompt;
   supplying the input signal to a speech recognizer having an acoustic model of a target vocabulary, said acoustic target vocabulary model mathematically representing at least one user-generated command word;
   comparing the input signal to the acoustic prompt model and to the acoustic target vocabulary model;
   determining which of the acoustic prompt model and the acoustic target vocabulary model provides a best match for the input signal during the comparing step;
   accepting the best match if the acoustic target vocabulary model provides the best match; and
   ignoring the best match if the acoustic prompt model provides the best match.

2. The method of claim 1, wherein the step of generating an acoustic model of the outgoing system voice prompt is performed in advance of the comparing step and includes the steps of:
   determining phonetic units utilized in the words of the outgoing system voice prompt;
   storing the phonetic units in a phonetic unit database accessible by the speech recognizer;
   providing the speech recognizer with an orthographic text of the outgoing system voice prompt prior to playing the prompt; and
   building the prompt model by the speech recognizer, said speech recognizer selecting and concatenating appropriate phonetic units based on the orthographic text of the outgoing system voice prompt.

3. The method of claim 2, wherein a plurality of outgoing system voice prompts are stored in a system prompt database accessible by a prompt server that plays selected prompts, and phonetic units associated with the words of the plurality of outgoing system voice prompts are stored in the phonetic unit database, and wherein the method further comprises, prior to supplying the input signal to the speech recognizer, the steps of:
   instructing the prompt server to select and play a selected outgoing system voice prompt;
   informing the speech recognizer which outgoing system voice prompt is going to be played; and
   retrieving by the speech recognizer, phonetic units from the phonetic unit database that are appropriate for an acoustic prompt model corresponding to the selected outgoing system voice prompt.

4. The method of claim 1, wherein the step of generating an acoustic model of the outgoing system voice prompt includes the steps of:
   sending the speech signal of the outgoing system voice prompt to the speech recognizer; and
   generating the acoustic prompt model from the speech signal immediately before the comparing step.

5. The method of claim 1, wherein the step of generating an acoustic model of the outgoing system voice prompt includes generating the acoustic prompt model at an attenuation level of approximately 20 dB relative to the outgoing system voice prompt.

6. The method of claim 1, further comprising the steps of:
   comparing the input signal to a silence model, at least one out-of-vocabulary word model, and at least one noise model;
   determining whether one of the silence, out-of-vocabulary, or noise models provides the best match during the comparing step; and
   ignoring the best match if one of the silence, out-of-vocabulary, or noise models provides the best match.

7. The method of claim 6, wherein the step of comparing the input signal to a silence model, at least one out-of-vocabulary word model, and at least one noise model includes comparing the input signal to a noise model that represents background babble.

8. The method of claim 6, wherein the step of comparing the input signal to a silence model, at least one out-of-vocabulary word model, and at least one noise model includes comparing the input signal to a noise model that represents background car noise.

9. The method of claim 1, wherein the step of supplying the input signal to the speech recognizer includes supplying to a simple connected word recognition grammar, the input signal in parallel with the acoustic target vocabulary model and the acoustic prompt model.

10. A method of suppressing speech recognition errors and improving word accuracy in a speech recognition system that enables a user of a communication device to interrupt an outgoing system voice prompt with user-generated command words that halt the outgoing voice prompt and initiate desired actions, said method comprising the steps of:
    generating an acoustic model of the outgoing system voice prompt, said acoustic prompt model mathematically representing the words of the outgoing system voice prompt;
    storing the acoustic prompt model in a speech recognizer;
    storing an acoustic target vocabulary model in the speech recognizer, said acoustic target vocabulary model including models of a plurality of user-generated command words;
    supplying an input signal to a comparer in the speech recognizer, said input signal including at least one user-generated command word and an echo from the outgoing system voice prompt, wherein at least one word of the outgoing system voice prompt is included in the echo in the input signal;
    comparing the input signal to the acoustic target vocabulary model and the acoustic prompt model to identify which model provides a best match for the input signal;
    ignoring the best match if the acoustic prompt model provides the best match;
    accepting the best match if the acoustic target vocabulary model provides the best match;
    supplying to an action table, any command word corresponding to the best match provided by the acoustic target vocabulary model;
    identifying from the action table, an action corresponding to the supplied command word;
    halting the outgoing system voice prompt; and
    initiating the identified action.

11. A speech recognizer for recognizing input command words while suppressing speech recognition errors, said speech recognizer comprising:
    means for receiving an input signal that comprises incoming user input speech and an echo from an outgoing system voice prompt, wherein at least one word of the outgoing system voice prompt is included in the echo received in the input signal;
    an acoustic vocabulary model that mathematically represents at least one command word;
    an acoustic prompt model that mathematically represents the words of the outgoing system voice prompt; and
    a comparer that receives the input signal and compares the input signal to the acoustic vocabulary model and to the acoustic prompt model to determine which model provides a best match for the input signal, said comparer accepting the best match if the acoustic target vocabulary model provides the best match, and ignoring the best match if the acoustic prompt model provides the best match.

12. The speech recognizer of claim 11, further comprising means for generating the acoustic prompt model from a known text.

13. The speech recognizer of claim 11, further comprising means for generating the acoustic prompt model from the speech signal of the outgoing system voice prompt prior to playing the prompt.

14. The speech recognizer of claim 11, further comprising means for generating the acoustic prompt model at an attenuation level of approximately 20 dB relative to the outgoing system voice prompt.

15. The speech recognizer of claim 11, further comprising a silence model, at least one out-of-vocabulary word model, and at least one noise model connected to the comparer in parallel with the acoustic vocabulary model and the acoustic prompt model, wherein the comparer also determines whether the best match is provided by the silence model, the at least one out-of-vocabulary word model, or the at least one noise model, and if so, ignores the best match.

16. The speech recognizer of claim 15, wherein the at least one noise model includes a noise model that represents background babble.

17. The speech recognizer of claim 15, wherein the at least one noise model includes a noise model that represents background car noise.

18. The speech recognizer of claim 11, wherein the comparer includes a comparison function selected from a group consisting of:
- an arbitrary grammar;
- a simple connected word recognition grammar; and
- a language model.

19. A speech recognition system for suppressing speech recognition errors and improving word accuracy, said system enabling a user of a communication device to interrupt an outgoing system voice prompt with user-generated command words that halt the outgoing system voice prompt and initiate desired actions, said system comprising:
- means for generating an acoustic model of the outgoing system voice prompt, said acoustic prompt model mathematically representing the words of the outgoing system voice prompt;
- an acoustic vocabulary model comprising mathematical models of a plurality of user-generated command words;
- a comparer for receiving an input signal and comparing the input signal to the acoustic vocabulary model and to the acoustic prompt model to determine which model provides a best match for the input signal, said input signal including at least one user-generated command word and an echo from the outgoing system voice prompt, wherein at least one word of the outgoing system voice prompt is included in the echo in the input signal, said comparer accepting the best match if the acoustic target vocabulary model provides the best match, and ignoring the best match if the acoustic prompt model provides the best match; and
- an action table that receives a command word from the comparer upon a determination by the comparer that the acoustic target vocabulary model provides the best match, said action table associating the received command word with a corresponding action, and notifying an associated network to initiate the corresponding action, and to halt the outgoing system voice prompt.

20. The speech recognition system of claim 19, wherein the means for generating the acoustic prompt model includes means for generating the acoustic prompt model from a known text.

21. The speech recognition system of claim 19, wherein the means for generating the acoustic prompt model includes means for generating the acoustic prompt model from the speech signal of the outgoing system voice prompt prior to playing the prompt.

22. The speech recognition system of claim 19, wherein the means for generating the acoustic prompt model includes means for generating the acoustic prompt model at an attenuation level of approximately 20 dB relative to the outgoing system voice prompt.

* * * * *